US012623284B2

(12) United States Patent
Xu et al.

(10) Patent No.: US 12,623,284 B2
(45) Date of Patent: May 12, 2026

(54) MANUFACTURE METHOD OF BUSHING, BUSHING AND EXCAVATOR

(71) Applicant: JIANGSU XCMG CONSTRUCTION MACHINERY RESEARCH INSTITUTE LTD., Xuzhou (CN)

(72) Inventors: Guo Xu, Xuzhou (CN); Bo Chen, Xuzhou (CN); Kun Feng, Xuzhou (CN)

(73) Assignee: JIANGSU XCMG CONSTRUCTION MACHINERY RESEARCH INSTITUTE LTD, Xuzhou (CN)

( * ) Notice: Subject to any disclaimer, the term of this patent is extended or adjusted under 35 U.S.C. 154(b) by 809 days.

(21) Appl. No.: 17/917,145

(22) PCT Filed: Dec. 14, 2021

(86) PCT No.: PCT/CN2021/137789
§ 371 (c)(1),
(2) Date: Oct. 5, 2022

(87) PCT Pub. No.: WO2022/193752
PCT Pub. Date: Sep. 22, 2022

(65) Prior Publication Data
US 2023/0166327 A1     Jun. 1, 2023

(30) Foreign Application Priority Data

Nov. 11, 2021    (CN) .......................... 202111332774.0

(51) Int. Cl.
B22F 7/06          (2006.01)
B22F 3/16          (2006.01)
(Continued)

(52) U.S. Cl.
CPC ............... B22F 7/062 (2013.01); B22F 3/16 (2013.01); B22F 3/26 (2013.01); B22F 5/106 (2013.01);
(Continued)

(58) Field of Classification Search
CPC ................................................ F16C 33/04–28
See application file for complete search history.

(56) References Cited

U.S. PATENT DOCUMENTS 5,427,600 A * 6/1995 Itoh ........................... C21D 1/18
                                                            419/33
6,015,775 A * 1/2000 Takayama ........... F16C 33/1095
                                                            508/108
(Continued)

FOREIGN PATENT DOCUMENTS

CN          1800667 A        7/2006
CN          101982262 A      3/2011
(Continued)

OTHER PUBLICATIONS

Extended European Search Report from EP Application No. 21931326.9 dated Feb. 25, 2025.
(Continued)

*Primary Examiner* — Sally A Merkling
*Assistant Examiner* — Austin Pollock
(74) *Attorney, Agent, or Firm* — Calfee, Halter & Griswold LLP

(57)                ABSTRACT

This disclosure relates to a manufacture method of a bushing, a bushing and an excavator to alleviate the problems of insufficient lubricity and wear resistance of the bushing. The bushing includes an inner ring and an outer ring. The manufacture method of the bushing includes the following steps: grinding a first mixed powder containing Fe, Al, Ti, Cr and V, nitriding the ground first mixed powder to form a nitrogen-rich stable compound powder, and then carrying out molding by pressing and sintering the nitrogen-rich stable compound powder to form the outer ring; grinding a second mixed powder containing Fe and Mo, sulfurizing the ground second mixed powder to form a sulfurized powder containing FeS and $MoS_2$, and carrying out molding by
(Continued)

pressing the sulfurized powder to form the inner ring; and placing the inner ring in the outer ring and carrying out sintering to obtain the bushing.

14 Claims, 2 Drawing Sheets

(51) Int. Cl.

| | |
|---|---|
| *B22F 3/26* | (2006.01) |
| *B22F 5/10* | (2006.01) |
| *B22F 9/04* | (2006.01) |
| *B22F 9/16* | (2006.01) |
| *F16C 33/12* | (2006.01) |
| *F16C 33/14* | (2006.01) |

(52) U.S. Cl.
CPC .................. *B22F 9/04* (2013.01); *B22F 9/16* (2013.01); *F16C 33/128* (2013.01); *F16C 33/145* (2013.01); *B22F 2301/052* (2013.01); *B22F 2301/205* (2013.01); *B22F 2301/35* (2013.01)

(56) References Cited

U.S. PATENT DOCUMENTS

| | | | |
|---|---|---|---|
| 6,086,257 | A | 7/2000 | Lee |
| 2007/0009757 | A1 | 1/2007 | Takayama et al. |
| 2008/0146467 | A1 | 6/2008 | Takayama |
| 2015/0240870 | A1 | 8/2015 | Tokushima et al. |
| 2016/0214171 | A1 | 7/2016 | Maetani et al. |
| 2021/0197524 | A1 | 7/2021 | Maroli et al. |
| 2021/0316364 | A1* | 10/2021 | Fukae ..................... C22C 38/24 |
| 2024/0309913 | A1 | 9/2024 | Sato et al. |

FOREIGN PATENT DOCUMENTS

| | | | | | |
|---|---|---|---|---|---|
| CN | 102062149 | A | | 5/2011 | |
| CN | 102979818 | A | | 3/2013 | |
| CN | 103447522 | A | | 12/2013 | |
| CN | 106041099 | A | | 10/2016 | |
| CN | 106216686 | A | | 12/2016 | |
| CN | 111187961 | A | | 5/2020 | |
| CN | 112958769 | A | | 6/2021 | |
| JP | S60218461 | A | | 11/1985 | |
| JP | H03219057 | A | * | 9/1991 | |
| JP | H06299284 | A | | 10/1994 | |
| JP | H11182556 | A | * | 7/1999 | ........... F16C 33/427 |
| JP | 2006111975 | A | * | 4/2006 | |
| JP | 2007225077 | A | * | 9/2007 | ........... F16C 33/427 |
| JP | 2017137580 | A | | 8/2017 | |
| JP | 2019011493 | A | | 1/2019 | |
| WO | WO-2010071373 | A2 | * | 6/2010 | ............. F16C 33/10 |

OTHER PUBLICATIONS

International Search Report from PCT/CN2021/137789 dated Jul. 29, 2022.
Office Action from Chinese Application No. 202111332774.0 dated Jun. 17, 2022.

\* cited by examiner

MANUFACTURE METHOD OF BUSHING, BUSHING AND EXCAVATOR

CROSS-REFERENCE TO RELATED APPLICATIONS

This application is a U.S. National Stage Application under 35 U.S.C. § 371 of International Patent Application No. PCT/CN2021/137789, filed on Dec. 14, 2021, which is based on and claims priority to CN application No. 202111332774.0, filed on Nov. 11, 2021, the disclosures of which are hereby incorporated by reference in their entirety.

TECHNICAL FIELD

This disclosure relates to the field of engineering machinery, and in particular, to a manufacture method of a bushing, a bushing and an excavator.

BACKGROUND

Working devices of an excavator can achieve different actions and transmit loads through multiple hinge pairs. Pins for hinged parts mainly employ steel bushings, copper bushings and powder metallurgy oil-impregnated bushings. Insufficient lubricity and wear resistance of the bushing at a hinge point will lead to problems such as excessive wear, frequent greasing, seizing lock, excessive temperature, and abnormal noise.

For some steel bushings, a machined oil storage tank, such as a splay-section, cross-section, or honeycomb oil storage tank, is adopted and then a heat treatment process such as induction quenching or carburizing and quenching is carried out. There are still some steel bushings sprayed with graphite and $MoS_2$ as an anti-friction layer so that their wear resistance and lubricity meet the requirements. The steel bushing has defects such as low material utilization rate and complex manufacturing process. When coupled with the pin, the steel bushing is prone to locking and material transfer. Frequent greasing is required to maintain boundary lubrication conditions. The sprayed anti-friction layer is generally only a few microns thin and it only has a certain effect in the early stage of running-in without improving the lubricity.

The copper bushing is made of cast brass as the base, and holes with orderly distribution and appropriate size are formed in the base, and then solid lubricants such as graphite and PTFE are embedded in the holes. The copper bushing has the dual advantages of copper alloy and solid lubricant. It can be applied under a condition of poor lubricity or a condition not suitable for greasing. The copper bushing has high material cost and low production efficiency. The processing of graphite holes damages the mechanical strength of the copper base, which causes poor impact resistance and load-bearing performance. The solid lubricant has blind distribution spots and is easy to fall off, thus reducing self-lubricating property.

Powder metallurgy oil-impregnated bushings are bushings made of porous materials and store lubricating oil in pores. When the powder metallurgy oil-impregnated bushing is loaded and reaches a certain speed, the power of the oil film formed by the lubricating oil seeping out of the pores can support the load of the shaft diameter, thus avoiding the direct contact between the pin and the bushing. Although powder metallurgy oil-impregnated bushings have the advantages of energy saving, high material utilization, high product precision and stable performance, they have the disadvantages of low hardness and insufficient wear resistance and can hardly meet the harsh working conditions of engineering machinery only by lubricating oil stored in the gaps of the bushings.

SUMMARY

According to an aspect of this disclosure, provided is a manufacture method of a bushing, the bushing including an inner ring and an outer ring, the manufacture method of the bushing including the following steps:

grinding a first mixed powder containing Fe, Al, Ti, Cr and V, nitriding the ground first mixed powder to form a nitrogen-rich stable compound powder, and then carrying out molding by pressing and sintering the nitrogen-rich stable compound powder to form the outer ring;

grinding a second mixed powder containing Fe and Mo, sulfurizing the ground second mixed powder to form a sulfurized powder containing FeS and $MoS_2$, and carrying out molding by pressing the sulfurized powder to form the inner ring; and placing the inner ring in the outer ring and carrying out sintering to obtain the bushing.

In some embodiments, the first mixed powder containing Fe, Al, Ti, Cr and V includes the following components in percentage by mass: 82% to 93% of Fe, 5.0% to 10.0% of Cr, 0.8% to 3.0% of Al, 1.0% to 3.0% of Ti, and 0.2% to 2.0% of V.

In some embodiments, the second mixed powder containing Fe and Mo includes the following components in percentage by mass: 85% to 97% of Fe and 3% to 15% of Mo.

In some embodiments, the first mixed powder containing Fe, Al, Ti, Cr and V is ground for 1 h to 4 h.

In some embodiments, the step of nitriding the ground first mixed powder includes: nitriding the ground first mixed powder in an atmosphere of flowing $NH_3$ at 400° C. to 700° C. for 1 h to 4 h.

In some embodiments, prior to the step of molding by pressing and sintering the nitrogen-rich stable compound powder, the method further includes a step of: adding a third mixed powder containing Fe and Cu to the nitrogen-rich stable compound powder, mixing thoroughly, and ball milling for 4 h to 6 h.

In some embodiments, the third mixed powder containing Fe and Cu includes the following components in percentage by mass: 90% to 95% of Fe and 5% to 10% of Cu.

In some embodiments, the step of molding by pressing and sintering the nitrogen-rich stable compound powder includes: putting the nitrogen-rich stable compound powder into a bushing mold, and pressing and molding the nitrogen-rich stable compound powder with a pressure of 650 MPa to 800 MPa.

In some embodiments, the second mixed powder containing Fe and Mo is ground for 1 h to 4 h.

In some embodiments, the sulfurizing the ground second mixed powder includes: sulfurizing the ground second mixed powder in a sealed tank full filled with $H_2S$ gas at 540° C. to 600° C. for 1 h to 3 h.

In some embodiments, the step of molding by pressing the sulfurized powder includes: putting the sulfurized powder into the bushing mold, and pressing and molding the sulfurized powder with a pressure of 700 MPa to 850 MPa.

In some embodiments, the step of placing the inner ring in the outer ring and carrying out sintering to obtain the bushing includes: assembling the inner ring and the outer ring and then carrying out sintering in a high-temperature furnace with a protective atmosphere of an inert gas at 1210° C. to 1260° C. for 1 h to 3 h.

In some embodiments, the manufacture method of a bushing further includes a step of: carrying out vacuum oil impregnating on the sintered bushing.

In some embodiments, the step of carrying out vacuum oil impregnating on the sintered bushing includes: cleaning the sintered bushing, placing the cleaned bushing in a vacuum chamber, sealing and vacuuming the vacuum chamber to −750 mmHg to −650 mmHg, and then feeding lubricating oil into the vacuum chamber, heating up to 80° C. to 90° C. and holding the temperature for 30 min to 50 min.

According to another aspect of this disclosure, further provided is a bushing prepared and formed by using the above-mentioned manufacture method of a bushing.

According to yet another aspect of this disclosure, further provided is an excavator including the bushing mentioned above.

Based on the above technical solutions, this disclosure has at least the following beneficial effects:

In some embodiments, Fe, Al, Ti, Cr, and V powders are ground and nitrided into a nitrogen-rich stable compound powder and the outer ring of the bushing comes out of a blank made from the nitrogen-rich stable compound powder by pressing and sintering. The nitride particle reinforced alloy has excellent tensile strength, creep strength and fatigue strength, as well as high hardness and excellent wear resistance. In addition, Fe and Mo powders are sulfurized to form a sulfurized powder containing FeS and $MoS_2$, and the sulfurized powder is then pressed and molded into the inner ring of the bushing. The solid lubricating layer of FeS and $MoS_2$ can be continuously decomposed and transferred during a friction process, and in combination with the oil storage function of powder metallurgy, it can achieve liquid-solid synergistic lubrication between friction pairs, thus reducing the friction coefficient and improving the resistance to adhesive seizure in the absence of grease lubrication.

BRIEF DESCRIPTION OF THE DRAWINGS

The drawings described here are used to provide a further understanding of this disclosure and constitute a part of the present application. The exemplary embodiments of this disclosure and their descriptions are provided to explain this disclosure and do not constitute an improper limitation on this disclosure. In the drawings.

It should be understood that the dimensions of the various parts shown in the drawings are not given to actual scale. Furthermore, the same or similar reference numerals denote the same or similar components.

DETAILED DESCRIPTION OF THE EMBODIMENTS

Various exemplary embodiments of this disclosure will now be described in detail with reference to the accompanying drawings. The description of the exemplary embodiments is merely illustrative and in no way limits the disclosure, its application or uses in any way. This disclosure may be implemented in many different forms and is not limited to the embodiments described herein. These embodiments are provided so that this disclosure will be thorough and complete, and will fully convey the scope of this disclosure to those skilled in the art. It should be noted that unless specifically stated otherwise, the relative arrangements of parts and steps, compositions of materials, numerical expressions and numerical values set forth in these embodiments are to be interpreted as illustrative only and not as limiting.

As used in this disclosure, "first," "second," and similar words do not denote any order, quantity, or importance, but are merely used to distinguish the different parts. "including" or "containing" and similar words mean that the element preceding the word covers the elements listed after the word, and does not exclude the possibility that other elements are also covered. Words, such as "up," "down," "left," and "right", are used only to indicate relative positional relationships. When the absolute position of the described object changes, the relative positional relationship may also change accordingly.

All terms (including technical or scientific terms) used in this disclosure have the same meaning as understood by one of ordinary skill in the art to which this disclosure belongs, unless specifically defined otherwise. It should also be understood that terms defined in, for example, general dictionaries should be construed to have meanings consistent with their meanings in the context of the related art and not to be interpreted in an idealized or highly formalized sense unless explicitly defined as such herein.

Techniques, methods, and devices known to those of ordinary skill in the related art may not be discussed in detail, but where appropriate, such techniques, methods, and devices should be considered part of the description.

Some embodiments of this disclosure provide a manufacture method of a bushing, a bushing, and an excavator to alleviate the problems of insufficient lubricity and wear resistance of the bushing.

In order to obtain more excellent wear resistance and self-lubricating property of the bushing and meet the increasing use requirements of engineering machinery and equipment, the embodiments of this disclosure adopt multi-layer powder metallurgy sintering to prepare a wear-resistant and self-lubricating bushing, which is adapted to alleviate the problems of insufficient load-bearing capacity, wear resistance and lubricity of the bushing in the related art.

Figure 1:
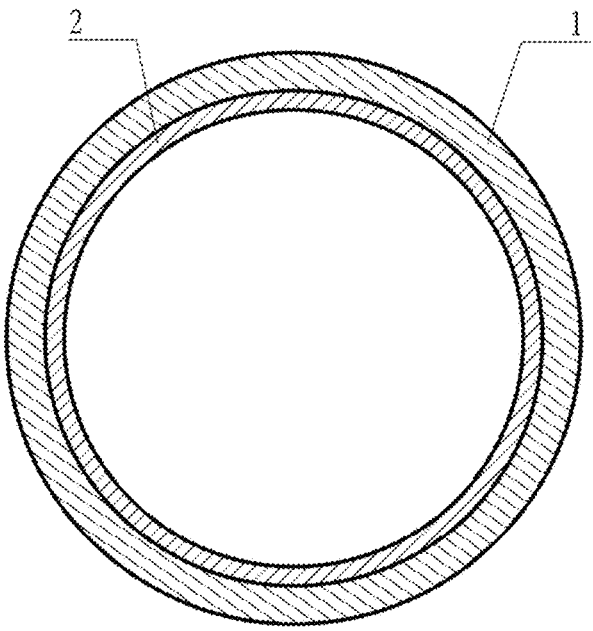
FIG. 1 is a schematic structural diagram of a bushing according to some embodiments of this disclosure.

As shown in FIG. 1, the bushing includes an inner ring 2 and an outer ring 1.

Figure 2:
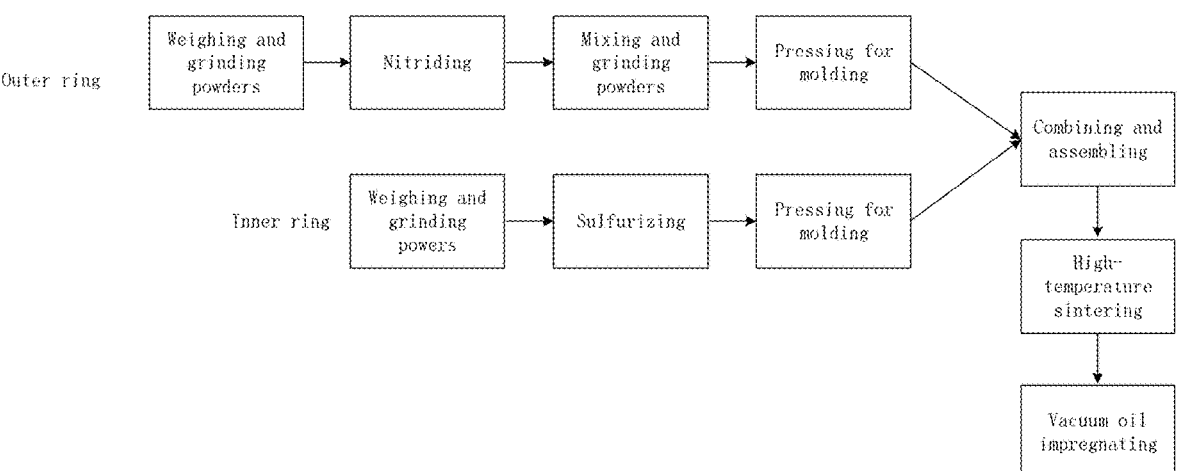
FIG. 2 is a schematic flowchart of a manufacture method of a bushing according to some embodiments of this disclosure.

As shown in FIG. 2, in some embodiments, the manufacture method of the bushing includes the following steps:

grinding a first mixed powder containing Fe, Al, Ti, Cr and V, nitriding the ground first mixed powder to form a nitrogen-rich stable compound powder, and then carrying out molding by pressing and sintering the nitrogen-rich stable compound powder to form the outer ring 1;

grinding a second mixed powder containing Fe and Mo, sulfurizing the ground second mixed powder to form a sulfurized powder containing FeS and $MoS_2$, and carrying out molding by pressing the sulfurized powder to form the inner ring 2; and placing the inner ring 2 in the outer ring 1 and carrying out sintering to obtain the bushing.

The manufacture method of the bushing adopts the multi-layer powder metallurgy sintering and molding. Fe, Al, Ti, Cr, and V powders are ground and nitride into a nitrogen-rich stable compound powder and the outer ring 1 of the bushing comes out of a blank made from the nitrogen-rich stable compound powder by pressing and sintering. The nitride particle reinforced alloy has excellent tensile strength, creep strength and fatigue strength, as well as high hardness and excellent wear resistance. For example, these properties can be further improved by reducing the size of the dispersed particles.

In addition, Fe and Mo powders are sulfurized to form a sulfurized powder containing FeS and $MoS_2$, and the sulfurized powder is then pressed and molded into the inner ring 2 of the bushing. The solid lubricating layer of FeS and $MoS_2$ can be continuously decomposed and transferred during a friction process, and in combination with the oil storage function of powder metallurgy, it can achieve liquid-solid synergistic lubrication between friction pairs, thus reducing the friction coefficient and improving the resistance to adhesive seizure in the absence of grease lubrication.

The bushing prepared by the multi-layer powder metallurgy sintering and molding according to the embodiments of this disclosure has the properties of high wear resistance and high load bearing, and the sulfurization of Fe and Mo powders can avoid the defects of methods such as gas sulfurization, liquid sulfurization, and ion sulfurization and control the thickness of a sulfide layer.

In some embodiments, the first mixed powder containing Fe, Al, Ti, Cr and V includes the following components in percentage by mass: 82% to 93% of Fe, 5.0% to 10.0% of Cr, 0.8% to 3.0% of Al, 1.0% to 3.0% of Ti, and 0.2% to 2.0% of V.

In some embodiments, the second mixed powder containing Fe and Mo includes the following components in percentage by mass: 85% to 97% of Fe and 3% to 15% of Mo.

In some embodiments, the first mixed powder containing Fe, Al, Ti, Cr and V is ground for 1 h to 4 h (hour).

In some embodiments, the step of nitriding the ground first mixed powder includes: nitriding the ground first mixed powder in an atmosphere of flowing $NH_3$ at 400° C. to 700° C. for 1 h to 4 h.

In some embodiments, prior to the step of molding by pressing and sintering the nitrogen-rich stable compound powder, the method further includes a step of: adding a third mixed powder containing Fe and Cu to the nitrogen-rich stable compound powder, mixing thoroughly, and ball milling for 4 h to 6 h.

In some embodiments, the third mixed powder containing Fe and Cu includes the following components in percentage by mass: 90% to 95% of Fe and 5% to 10% of Cu.

In some embodiments, the step of molding by pressing and sintering the nitrogen-rich stable compound powder includes: putting the nitrogen-rich stable compound powder into a bushing mold, and pressing and molding the nitrogen-rich stable compound powder with a pressure of 650 MPa to 800 MPa.

In some embodiments, the second mixed powder containing Fe and Mo is ground for 1 h to 4 h.

In some embodiments, the sulfurizing the ground second mixed powder includes: sulfurizing the ground second mixed powder in a sealed tank full filled with $H_2S$ gas at 540° C. to 600° C. for 1 h to 3 h.

In some embodiments, the step of molding by pressing the sulfurized powder includes: putting the sulfurized powder into the bushing mold, and pressing and molding the sulfurized powder with a pressure of 700 MPa to 850 MPa.

In some embodiments, the step of placing the inner ring in the outer ring and carrying out sintering to obtain the bushing includes: assembling the inner ring and the outer ring and then carrying out sintering in a high-temperature furnace with a protective atmosphere of an inert gas at 1210° C. to 1260° C. for 1 h to 3 h.

In some embodiments, the manufacture method of a bushing further includes a step of: carrying out vacuum oil impregnating on the sintered bushing.

In some embodiments, the step of carrying out vacuum oil impregnating on the sintered bushing includes: cleaning the sintered bushing, placing the cleaned bushing in a vacuum chamber, sealing and vacuuming the vacuum chamber to −750 mmHg to −650 mmHg, and then feeding lubricating oil into the vacuum chamber, heating up to 80° C. to 90° C. and holding the temperature for 30 min to 50 min.

In some embodiments, the manufacture method of the bushing includes the following steps.

In step S1, Fe powder, Cr powder, Al powder, Ti powder, and V powder are weighed according to the mass ratio of components of the outer ring 1 and then thoroughly mixed to form the first mixed powder, and the first mixed powder is then ball milled for 1 h to 4 h. Ball milling is carried out to refine the powder and reduce the diffusion distance of nitrogen ions in the metal powder on the one hand and to mix various powders uniformly and prevent segregation on the other hand.

In step S2, the above-mentioned ball-milled first mixed powder is nitrided in an atmosphere of flowing $NH_3$ at 400° C. to 700° C. for 1 h to 4 h to form a nitride powder.

In step S3, Fe—Cu powder is added to the nitride powder and the mixture is then mixed thoroughly and ball milled for 4 h to 6 h. Fe—Cu (90%-95% Fe, 5%-10% Cu) powder with a low hardness has excellent fluidity and plastic forming ability, which is convenient for die casting. Ball milling helps nitrides to be better dispersed in the Fe—Cu powder and enhances the effect of the second phase strengthening.

In step S4, the thoroughly mixed and ball-milled powder in step S3 is put into a bushing mold, and then pressed and molded with a pressure of 650 MPa to 800 MPa to obtain an outer ring 1 blank with a density of 6.3 $g/cm^3$ to 6.9 $g/cm^3$. Powder pressing and molding is the most important step in the powder metallurgy process. Under the action of pressure, the powder is displaced, deformed and rearranged, with reduction in porosity and increase in density.

In step S5, Fe powder and Mo powder are weighed according to the ratio of the components in the inner ring 2 and then thoroughly mixed to form the second mixed powder, and the second mixed powder is then ball milled for 1 h to 4 h.

In step S6, the above-mentioned ball-milled second mixed powder is sulfurized in a sealed tank full filled with $H_2S$ gas at 540° C. to 600° C. for 1 h to 4 h. The main purpose is to form FeS and $MoS_2$, which can significantly improve scratch resistance, seizure resistance and wear resistance of the surface of the bushing.

In step S7, the above-mentioned sulfurized powder is put into a mold, and then pressed and molded with a pressure of 700 MPa to 850 MPa.

In step S8, the inner ring 1 and the outer ring 2 of the bushing are assembled and then sintered in a high-temperature furnace with a protective atmosphere of an inert gas at 1210° C. to 1260° C. for 1 h to 3 h.

Low-temperature sintering is solid-state sintering which achieves densification through solid-state diffusion and homogenization. Sintering at a temperature higher than 1200° C. belongs to liquid sintering which achieves high density through liquid diffusion. The liquid sintering employed in the embodiments of this disclosure can achieve high density on the one hand, and improve the bonding strength of the inner ring 2 and the outer ring 1 on the other hand, so as to prevent the sulfide layer from peeling off during the use of the bushing.

In step S9, vacuum oil impregnating is carried out as follow: cleaning the sintered bushing, placing the cleaned bushing in a vacuum chamber, sealing and vacuuming the vacuum chamber to −750 mmHg to −650 mmHg, and then feeding lubricating oil into the vacuum chamber, heating up to 80° C. to 90° C. and holding the temperature for 30 min to 50 min.

In step S10, the oil-impregnated busing is reshaped by a press to reach the required size and tolerance range. Then, chamfering and deburring are carried out.

In the above embodiments, in terms of mass, the outer ring 1 of the bushing includes the following reinforcing components: 82% to 93% of Fe; 5.0% to 10.0% of Cr; 0.8% to 3.0% of Al, 1.0% to 3.0% of Ti, and 0.2% to 2.0% of V. The base of the outer ring 1 of the bushing includes the following components: 90% to 95% of Fe and 5% to 10% of Cu.

The inner ring 2 of the bushing includes the following components: 85% to 97% of Fe and 3% to 15% of Mo.

The bushing prepared by the manufacture method of a bushing according to the embodiments of this disclosure has excellent overall performance, with the density of 6.3 g/cm$^3$ to 6.9 g/cm$^3$, the oil content of 14% to 20%, the radial crushing strength of 650 MPa to 750 MPa, and the hardness of 280 HBW to 340 HBW. In the rocking durability test, the friction coefficient is stable at ≤0.18 and the temperature rise is ≤95° C.

A specific embodiment of the manufacture method of a bushing is given below.

In this specific embodiment, in percentage by mass, the outer ring 1 of the bushing included the following reinforcing components: 90% of Fe, 5.6% of Cr, 1.8% of Al, 1.2% of Ti, and 1.4% of V. The powders of the outer ring 1 were thoroughly mixed and ball milled for 2 h. The mixed powder was nitrided at 560° C. in an atmosphere of flowing NH$_3$ for 3 h. Fe—Cu powder (90% Fe, 10% Cu) was added to the nitride powder and the mixture was then mixed thoroughly and ball milled for 4 h. The thoroughly mixed powder is put in the mold of the outer ring 1 of the bushing and pressed with a pressure of 750 MPa to the density of 6.9 g/cm$^3$.

The inner ring of the bushing included the following two elements in percentage by mass: 94.5% of Fe and 5.5% of Mo. The powders of inner ring 2 were thoroughly mixed and ball-milled for 2 h. The mixed and ball-milled powder was sulfurized in a sealed tank full filled with H$_2$S at 580° C. for 2 h. The sulfurized powder was put in the mold of the inner ring 2 of the bushing and die-casted at 700 MPa.

The inner ring 1 and the outer ring 2 of the bushing were assembled and then sintered in a high-temperature furnace with a protective atmosphere of an inert gas at 1220° C. for 1.5 h.

The sintered bushing was cleaned and then placed in a vacuum chamber. The vacuum chamber was sealed and vacuumed to −720 mmHg. Lubricating oil was fed into the vacuum chamber. Heating was then carried out until the temperature of 80° C. was reached and this temperature was held for 30 min.

A press was used for shaping, and chamfering and deburring were carried out.

The bushing obtained by the above method has the density of 6.8 g/cm$^3$, the oil content of 14%, the radial crushing strength of 670 MPa, and the hardness of 300 HBW.

The powder metallurgy oil-impregnated bushings prepared by some related technologies have the density of 6.6 g/cm$^3$, the oil content of 14% to 18%, the radial crushing strength of about 500 MPa, and the hardness of 200 HBW to 220 HBW.

Comparison of the rocking durability performance of the bushings prepared by the embodiments of this disclosure is as follows.

Size requirements: the test-piece was required to have the size of Φ50 mm×Φ40 mm×30 mm and the inner surface roughness of Ra1.6.

Requirements for grinding shaft: the grinding shaft was required to be made of 45 # steel and have the hardness of 43 HRC to 47 HRC, the inner surface roughness of Ra0.8, and the cylindricity of Φ0.01 mm.

Test conditions: constant speed and constant load test was carried out for 100 h, with the limit temperature of 130° C., the bearing pressure of 60 MPa, the rocking angle of +45°, the line speed of 1 m/min, where greasing was carried out at the initial state, and no greasing was performed during the test.

| Property index | Unit | Bushings prepared by the embodiments of this disclosure | Powder metallurgy oil-impregnated bushings prepared by some related technologies | Steel bushings prepared by some related technologies |
|---|---|---|---|---|
| Friction coefficient | | 0.14-0.16 | Failed after 30 h of test | The friction coefficient exceeds the limit after 60 h of test |
| Abrasion loss | mm | ≤0.06 | / | / |
| Temperature rise | | ≤85 | / | / |

Figure 3:
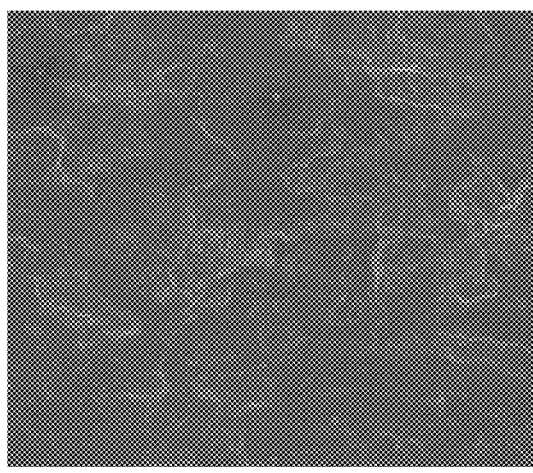
FIG. 3 is a SEM image of wear scars on a bushing according to some embodiments of this disclosure.
Figure 4:
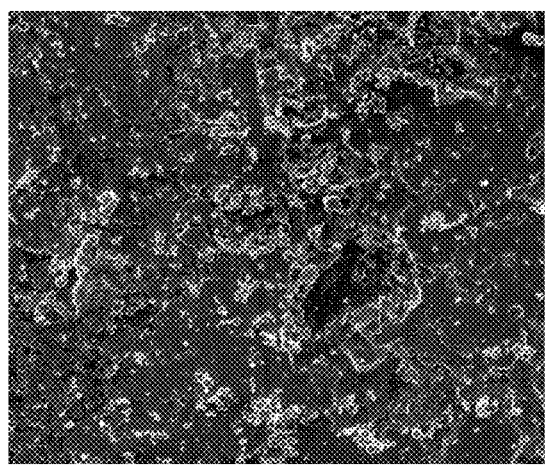
FIG. 4 is a SEM image of wear scars on a powder metallurgy bushing according to some related technologies.
Figure 5:
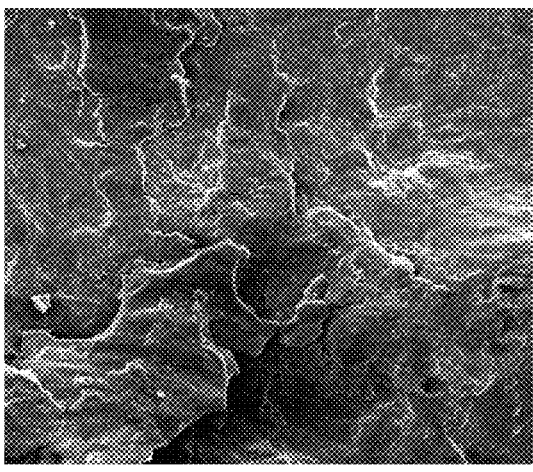
FIG. 5 is a SEM image of wear scars on a steel bushing according to some related technologies.

Through the above test, SEM images as shown in FIGS. 3 to 5 were obtained.

The manufacture method of a bushing according to the embodiments of this disclosure adopts the method of multi-layer sintering. Fe, Al, Ti, Cr, V powders were nitrided to form a nitrogen-rich stable compound, Fe—Cu powder was then added to the nitrogen-rich stable compound, and the mixture was then pressed to form a blank, and the blank is then prepared into the base. Fe and Mo powders are sulfurized to form FeS and MoS$_2$ and the sulfides are then pressed and molded to form a surface layer. Then, the two layers are assembled into a whole and sintered at a high temperature to finally achieve excellent comprehensive mechanical properties.

The bushing prepared by the manufacture method of a bushing according to the embodiments of this disclosure has high wear resistance, good self-lubricating property and excellent comprehensive mechanical properties, with the density of 6.3 g/cm$^3$ to 6.9 g/cm$^3$, the oil content of 14% to 20%, the radial crushing strength of 650 MPa to 750 MPa, and the hardness of 300 HBW to 360 HBW. In the rocking durability test, the friction coefficient is stable within a range of 0.14 to 0.16 and the temperature rise is ≤85° C.

Compared with the powder metallurgy oil-impregnated bushings prepared by some related technologies, the bushing prepared by the manufacture method of a bushing according to the embodiments of this disclosure has at least the following beneficial effects:

The friction coefficient is low; the inner surface of the bushing has a layer of sulfurized solid anti-friction layer; FeS and $MoS_2$ have the characteristics of low shear strength, easy sliding, and excellent anti-friction performance. Combined with the lubricating oil stored in the oil-containing pores of powder metallurgy, solid-liquid synergistic lubrication is achieved, which can significantly reduce the friction coefficient and achieve better self-lubricating property.

The cost is reduced, only a small amount of Cu can be used, and precious Ni is not used, and its performance is better than that of traditional powder metallurgy oil-impregnated bushings.

The wear resistance is high. The outer ring 1 of the bushing is reinforced with nitride particles, and a large number of nitride particles are scattered in the Fe—Cu base. Excellent tensile strength, creep strength and fatigue strength, as well as high hardness and excellent wear resistance are achieved. Its load-bearing performance is further enhanced by ball milling and sintering.

The manufacture method of a bushing according to the embodiments of this disclosure is easy to implement and controllable in cost. The radial crushing strength and hardness of the bushing are excellent. Through nitride particle enhancement and solid-liquid synergistic lubrication, the high wear resistance and self-lubricating property of the bushing can be achieved, the load-bearing capacity of the bushing and its wear resistance and self-lubricating property under poor lubrication conditions can be greatly improved. Wear resistance and service life of the bushing of a working device of engineering machinery at a hinge point can be improved greatly.

Some embodiments of this disclosure further provide a bushing prepared and formed by adopting the above-mentioned manufacture method of a bushing.

The bushing prepared by the manufacture method of a bushing according to the embodiments of this disclosure has excellent wear resistance, self-lubricating property, and overall mechanical properties. Its wear resistance and self-lubricating property are much higher than those of powder metallurgy oil-impregnated bushings and steel bushings prepared by some related technologies. It can meet the mechanical property requirements of the working device of engineering machinery for the bushing and greatly reduce the cost. The solid lubricating layer can be continuously decomposed and transferred during a friction process, and in combination with the lubricating oil stored in pores of powder metallurgy, it can achieve liquid-solid synergistic lubrication between the pin and the bushing and is especially suitable for poorly lubricated parts. When installed on small and medium-tonnage excavators, the bushing shows excellent wear resistance and self-lubricating property, and can achieve 50 h grease-free maintenance.

The bushing prepared by the manufacture method of a bushing according to the embodiments of this disclosure can be applied to hinge points of working devices of excavators, cranes, and loaders, and is especially suitable for small and medium-tonnage excavators and loaders.

Some embodiments of this disclosure further provide an excavator including the bushing described above.

Based on the above-mentioned embodiments of this disclosure, the technical features of one of the embodiments may be beneficially combined with one or more other embodiments, unless explicitly denied.

While some specific embodiments of this disclosure have been described in detail by way of examples, those skilled in the art will appreciate that the above examples are provided for illustration only, and are not intended to limit the scope of this disclosure. Those skilled in the art should understand that, without departing from the scope and spirit of this disclosure, the above embodiments can be modified or some technical features can be equivalently replaced. The scope of this disclosure is defined by the appended claims.

The invention claimed is:

1. A method of manufacturing a bushing, the bushing comprising an inner ring and an outer ring, the method comprising:
grinding a first mixed powder containing Fe, Al, Ti, Cr and V;
nitriding the ground first mixed powder to form a nitride-containing powder, and
molding the nitride-containing powder by pressing the nitride-containing powder and sintering the pressed nitride-containing powder to form the outer ring;
grinding a second mixed powder containing Fe and Mo;
sulfurizing the ground second mixed powder to form a sulfurized powder containing FeS and $MoS_2$; and
molding the sulfurized powder by pressing the sulfurized powder to form the inner ring;
placing the inner ring in the outer ring; and
sintering the inner ring and the outer ring to obtain the bushing.

2. The method according to claim 1, wherein the first mixed powder containing Fe, Al, Ti, Cr and V comprises the following components in percentage by mass: 82% to 93% of Fe, 5.0% to 10.0% of Cr, 0.8% to 3.0% of Al, 1.0% to 3.0% of Ti, and 0.2% to 2.0% of V.

3. The method according to claim 1, wherein the second mixed powder containing Fe and Mo comprises the following components in percentage by mass: 85% to 97% of Fe and 3% to 15% of Mo.

4. The method according to claim 1, wherein the first mixed powder containing Fe, Al, Ti, Cr and V is ground for 1 h to 4 h.

5. The method according to claim 1, wherein the step of nitriding the ground first mixed powder comprises: nitriding the ground first mixed powder in an atmosphere of flowing $NH_3$ at 400° C. to 700° C. for 1 h to 4 h.

6. The method according to claim 1, wherein the step of molding the nitride-containing powder comprises: putting the nitride-containing powder into a bushing mold, and pressing and molding the nitride-containing powder with a pressure of 650 MPa to 800 MPa.

7. The method according to claim 1, wherein the second mixed powder containing Fe and Mo is ground for 1 h to 4 h.

8. The method according to claim 1, wherein the step of sulfurizing the ground second mixed powder comprises sulfurizing the ground second mixed powder in a sealed tank containing $H_2S$ gas at 540° C. to 600° C. for 1 h to 3 h.

9. The method according to claim 1, wherein the step of molding the sulfurized powder comprises: putting the sulfurized powder into the bushing mold, and pressing and molding the sulfurized powder with a pressure of 700 MPa to 850 MPa.

10. The method according to claim 1, wherein the step of placing the inner ring in the outer ring and sintering the inner ring and the outer ring to obtain the bushing comprises assembling the inner ring and the outer ring and then carrying out the sintering in a furnace capable of heating to a temperature range of the sintering with a protective atmosphere of an inert gas at 1210° C. to 1260° C. for 1 h to 3 h.

11. The method according to claim 1, wherein prior to the step of molding the nitride-containing powder, the method further comprises adding a third mixed powder containing Fe and Cu to the nitride-containing powder, mixing the third mixed powder and the nitride-containing powder, and ball milling the mixture including the third mixed powder for 4 h to 6 h.

12. The method according to claim 11, wherein the third mixed powder containing Fe and Cu comprises the following components in percentage by mass: 90% to 95% of Fe and 5% to 10% of Cu.

13. The method according to claim 1, further comprising carrying out vacuum oil impregnating on the sintered bushing.

14. The method according to claim 13, wherein the step of vacuum oil impregnating on the sintered bushing comprises cleaning the sintered bushing, placing the cleaned bushing in a vacuum chamber, sealing and vacuuming the vacuum chamber to −750 mmHg to −650 mmHg, feeding lubricating oil into the vacuum chamber, heating up the vacuum chamber to 80° C. to 90° C., and holding the temperature for 30 min to 50 min.

\* \* \* \* \*